(12) United States Patent
Li et al.

(10) Patent No.: US 10,278,073 B2
(45) Date of Patent: Apr. 30, 2019

(54) PROCESSING METHOD FOR TERMINAL ACCESS TO 3GPP NETWORK AND APPARATUS

(71) Applicant: Huawei Technologies Co., Ltd., Shenzhen (CN)

(72) Inventors: He Li, Shanghai (CN); Youyang Yu, Shanghai (CN); Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/890,936

(22) Filed: Feb. 7, 2018

(65) Prior Publication Data

US 2018/0167813 A1  Jun. 14, 2018

Related U.S. Application Data

(63) Continuation of application No. PCT/CN2015/086390, filed on Aug. 7, 2015.

(51) Int. Cl.
| | |
|---|---|
| *H04W 72/02* | (2009.01) |
| *H04W 12/06* | (2009.01) |
| *H04W 48/02* | (2009.01) |
| *H04W 8/04* | (2009.01) |
| *H04W 8/24* | (2009.01) |
| *H04W 12/08* | (2009.01) |

(Continued)

(52) U.S. Cl.
CPC ......... *H04W 12/06* (2013.01); *H04L 63/0823* (2013.01); *H04L 63/126* (2013.01); *H04W 8/04* (2013.01); *H04W 8/24* (2013.01); *H04W 12/08* (2013.01); *H04W 48/02* (2013.01); *H04W 48/08* (2013.01)

(58) Field of Classification Search
CPC ......... H04W 12/06; H04W 8/04; H04W 8/24; H04W 12/08; H04W 48/08
See application file for complete search history.

(56) References Cited

U.S. PATENT DOCUMENTS

| | | | |
|---|---|---|---|
| 9,001,682 B2 | 4/2015 | Kovvali et al. | |
| 2009/0094351 A1 | 4/2009 | Gupta et al. | |

(Continued)

FOREIGN PATENT DOCUMENTS

| | | |
|---|---|---|
| CN | 101483922 A | 7/2009 |
| CN | 101778446 A | 7/2010 |

(Continued)

*Primary Examiner* — Pakee Fang
(74) *Attorney, Agent, or Firm* — Slater Matsil, LLP

(57) ABSTRACT

A processing method for terminal access to a 3GPP network is provided. A UE sends an access request message to a core network device on the 3GPP network, and the core network device sends an unauthorized access message to the UE after determining that the UE has no permission to access the 3GPP network. The unauthorized access message includes authentication information of the core network device. The UE performs authentication on the core network device according to the authentication information of the core network device, and executes a corresponding network access policy after authentication on the core network device by the UE succeeds, that is, after the UE determines that a source of the unauthorized access message is authorized.

20 Claims, 10 Drawing Sheets

(51) Int. Cl.
*H04W 48/08* (2009.01)
*H04L 29/06* (2006.01)

(56) References Cited

U.S. PATENT DOCUMENTS

| | | | |
|---|---|---|---|
| 2009/0097451 A1 | 4/2009 | Gogic | |
| 2012/0094667 A1* | 4/2012 | Nishida | H04W 60/00 455/435.1 |
| 2014/0024370 A1 | 1/2014 | Sen et al. | |
| 2015/0009824 A1* | 1/2015 | Jeong | H04W 48/14 370/235 |

FOREIGN PATENT DOCUMENTS

| | | |
|---|---|---|
| EP | 2400791 A1 | 12/2011 |
| RU | 2467509 C2 | 11/2011 |
| RU | 2488238 C2 | 11/2011 |
| WO | 2008099254 A2 | 8/2008 |
| WO | 2010013914 A2 | 2/2010 |
| WO | 2012095179 A1 | 7/2012 |

* cited by examiner

PROCESSING METHOD FOR TERMINAL ACCESS TO 3GPP NETWORK AND APPARATUS

CROSS-REFERENCE TO RELATED APPLICATIONS

This application is a continuation of International Application No. PCT/CN2015/086390, filed on Aug. 7, 2015, the disclosure of which is hereby incorporated by reference in its entirety.

TECHNICAL FIELD

The present application relates to the field of communications technologies, and in particular, to a processing method for terminal access to a 3GPP (3rd Generation Partnership Project) network and an apparatus.

BACKGROUND

3GPP mainly formulates globally applicable technical specifications and reports for a 3rd generation mobile communications system. All 3GPP architecture-based networks may be referred to as 3GPP networks, for example, a 3GPP framework-based mobile communications network.

A 3GPP network may provide a basis for communication between mobile terminals, and has advantages of wide signal coverage and relatively high mobility performance but has a relatively low data transmission rate. A non-3GPP network such as a WLAN (wireless local area network) may provide hotspot coverage, and may be characterized by a relatively high data transmission rate but relatively low mobility performance. Therefore, if the 3GPP network and the non-3GPP network are combined, user experience can be improved, network construction costs can be reduced, and fewer radio resources are required.

A UE (user equipment) may directly access a 3GPP network or may access a 3GPP network using a non-3GPP network. A core network device determines whether the UE is authorized to access the 3GPP network. If determining that the UE is unauthorized to access the 3GPP network, the core network device generates an unauthorized access message and sends the unauthorized access message to the UE. However, the UE still attempts to access the 3GPP network. It is assumed that 500 thousand users attempt to access the 3GPP network, and that 400 thousand users cannot access the 3GPP network because they do not have access permission, that is, an HSS sends an unauthorized access message to the 400 thousand users. However, the 400 thousand users still attempt to access the 3GPP network, resulting in excessively heavy load of the core network device.

SUMMARY

Embodiments of the present application provide a processing method for terminal access to a 3GPP network and an apparatus, to resolve a prior-art problem of excessively heavy load of a core network device.

To resolve the foregoing technical problem, the embodiments of the present application disclose the following technical solutions.

According to a first aspect, embodiments of the present application provide a processing method for a terminal access to a 3GPP network. The method includes sending, by a terminal, an access request message to a core network device on a 3rd Generation Partnership Project (3GPP) network, where the access request message is used to request to access the 3GPP network, and the access request message includes identity information of the terminal. The method further includes receiving, by the terminal, an unauthorized access message sent by the core network device, where the unauthorized access message is used to indicate that the terminal is unauthorized to access the 3GPP network, and performing, by the terminal, authentication on the core network device according to authentication information. The method also includes executing a corresponding network access policy after authentication on the core network device by the terminal succeeds, to reduce a quantity of access request messages that are sent by the terminal to the core network device.

With reference to the first aspect, in a first possible implementation of the first aspect, the authentication information includes a first message digest, and the first message digest is used by the terminal to perform authentication on a home subscriber server (HSS) in the core network device; and the performing, by the terminal, authentication on the core network device according to the authentication information includes: generating a second message digest according to a preset algorithm, the identity information of the terminal, and a failure message code carried in the unauthorized access message; and if the first message digest is the same as the second message digest, determining that authentication on the HSS succeeds; or if the first message digest is different from the second message digest, determining that authentication on the HSS fails.

With reference to the first aspect, in a second possible implementation of the first aspect, the authentication information includes an authentication vector set, the authentication vector set includes a first parameter and a message authentication code (MAC), and the first parameter is used to generate an expected message authentication code (X-MAC); and the performing, by the terminal, authentication on the core network device according to the authentication information includes: generating the X-MAC according to the first parameter; and if the X-MAC is the same as the MAC, determining that authentication on the HSS succeeds; or if the X-MAC is different from the MAC, determining that authentication on the HSS fails.

With reference to the first aspect, in a third possible implementation of the first aspect, the authentication information includes certificate information and signature information of an evolved packet data gateway (ePDG); and the performing, by the terminal, authentication on the core network device according to the authentication information includes: if both the certificate information and the signature information of the ePDG are correct, determining that authentication on the ePDG succeeds; or if the certificate information or the signature information of the ePDG is incorrect, determining that authentication on the ePDG fails.

With reference to the third possible implementation of the first aspect, in a fourth possible implementation of the first aspect, the authentication information further includes an authentication vector set, where the authentication vector set includes a first parameter and a MAC, and the first parameter is used to generate an X-MAC; and the performing, by the terminal, authentication on the core network device according to the authentication information further includes: generating the X-MAC according to the first parameter when authentication on the ePDG succeeds; and if the X-MAC is the same as the MAC, determining that authentication on an HSS succeeds; or if the X-MAC is different from the MAC, determining that authentication on the HSS fails.

With reference to at least one of the first aspect, or the first possible implementation, the second possible implementation, the third possible implementation, or the fourth possible implementation of the first aspect, in a fifth possible implementation of the first aspect, the executing a corresponding network access policy after authentication on the core network device by the terminal succeeds includes: stopping, by the terminal, an attempt to access the 3GPP network, and attempting to access the 3GPP network again when a status of the terminal satisfies a first preset condition, where the first preset condition includes at least one of the following: a subscriber identity module (SIM) card of the terminal is changed, the terminal restarts, duration of timing starting when an attempt to access the 3GPP network by the terminal fails exceeds first preset duration, or the terminal reselects a non-3GPP network.

With reference to the fifth possible implementation of the first aspect, in a sixth possible implementation of the first aspect, the access request message further includes access point name (APN) information, the APN information is used to indicate a non-3GPP network that is requested by the terminal for use, and the core network device includes the ePDG; and the stopping, by the terminal, an attempt to access the 3GPP network, and attempting to access the 3GPP network again when a status of the terminal satisfies a first preset condition includes: if the ePDG belongs to a home public land mobile network (HPLMN), stopping, by the terminal, an attempt to access the 3GPP network, and attempting to access the 3GPP network again when the status of the terminal satisfies at least one of the following: a SIM card of the terminal is changed, the terminal restarts, duration of timing starting when an attempt to access the 3GPP network by the terminal fails exceeds the first preset duration, or the terminal attempts to access the 3GPP network again by using the non-3GPP network corresponding to the APN information; or if the ePDG belongs to a visited public land mobile network (VPLMN), after reselecting the non-3GPP network, attempting, by the terminal, to access the 3GPP network by using the reselected non-3GPP network.

With reference to the fifth possible implementation of the first aspect, in a seventh possible implementation of the first aspect, the core network device does not include the ePDG, and the first preset condition includes: duration of timing starting when an attempt to access the 3GPP network by the terminal fails exceeds the first preset duration.

With reference to at least one of the first aspect, or the first possible implementation, the second possible implementation, the third possible implementation, the fourth possible implementation, the fifth possible implementation, the sixth possible implementation, or the seventh possible implementation of the first aspect, in an eighth possible implementation of the first aspect, the method further includes: if authentication on the core network device by the terminal fails, attempting, by the terminal, to access the 3GPP network again; and if a preset quantity of times of attempts all fail, attempting to access the 3GPP network again after second preset duration.

According to a second aspect, a processing method for terminal access to a 3GPP network is provided. The method includes receiving, by a core network device, an access request message sent by a terminal, where the access request message includes at least identity information of the terminal. The method also includes sending an unauthorized access message to the terminal when the core network device determines, according to the identity information of the terminal, that the terminal has no permission to access the 3GPP network, where the unauthorized access message includes authentication information of the core network device, and the authentication information is used by the terminal to perform authentication on the core network device.

With reference to the second aspect, in a first possible implementation of the second aspect, if the core network device includes an evolved packet data gateway (ePDG), the authentication information includes certificate information and signature information of the ePDG; or the authentication information includes certificate information and signature information of the ePDG and an authentication vector set, where the authentication vector set includes a first parameter and a message authentication code (MAC); or if the core network device does not include an ePDG, the authentication information includes a first message digest, where the first message digest is generated by an HSS according to a preset algorithm, a failure message code carried in the unauthorized access message, and the identity information of the terminal; or the authentication information includes the authentication vector set.

According to a third aspect, a terminal is provided that includes a sender, configured to send an access request message to a core network device on a 3rd Generation Partnership Project (3GPP) network, where the access request message is used to request to access the 3GPP network, and the access request message includes identity information of the terminal. The terminal further includes a receiver, configured to receive an unauthorized access message sent by the core network device, where the unauthorized access message is used to indicate that the terminal is unauthorized to access the 3GPP network. The method also includes a processor, configured to: perform authentication on the core network device according to authentication information; and execute a corresponding network access policy after authentication on the core network device succeeds, to reduce a quantity of access request messages that are sent by the terminal to the core network device.

With reference to the third aspect, in a first possible implementation of the third aspect, the authentication information includes a first message digest, and the first message digest is used by the terminal to perform authentication on a home subscriber server (HSS) in the core network device; and when performing authentication on the core network device according to the authentication information, the processor is specifically configured to: generate a second message digest according to a preset algorithm, the identity information of the terminal, and a failure message code carried in the unauthorized access message; and if the first message digest is the same as the second message digest, determine that authentication on the HSS succeeds; or if the first message digest is different from the second message digest, determine that authentication on the HSS fails.

With reference to the third aspect, in a second possible implementation of the third aspect, the authentication information includes an authentication vector set, the authentication vector set includes a first parameter and a message authentication code (MAC), and the first parameter is used to generate an expected message authentication code (X-MAC); and when performing authentication on the core network device according to the authentication information, the processor is specifically configured to: generate the X-MAC according to the first parameter; and if the X-MAC is the same as the MAC, determine that authentication on the HSS succeeds; or if the X-MAC is different from the MAC, determine that authentication on the HSS fails.

With reference to the third aspect, in a third possible implementation of the third aspect, the authentication information includes certificate information and signature information of an evolved packet data gateway (ePDG); and when performing authentication on the core network device according to the authentication information, the processor is specifically configured to: if both the certificate information and the signature information of the ePDG are correct, determine that authentication on the ePDG succeeds; or if the certificate information or the signature information of the ePDG is incorrect, determine that authentication on the ePDG fails.

With reference to the third possible implementation of the third aspect, in a fourth possible implementation of the third aspect, the authentication information further includes an authentication vector set, where the authentication vector set includes a first parameter and a MAC, and the first parameter is used to generate an X-MAC; and when performing authentication on the core network device according to the authentication information, the processor is further configured to: generate the X-MAC according to the first parameter when authentication on the ePDG succeeds; and if the X-MAC is the same as the MAC, determine that authentication on an HSS succeeds; or if the X-MAC is different from the MAC, determine that authentication on the HSS fails.

With reference to at least one of the third aspect, or the first possible implementation, the second possible implementation, the third possible implementation, or the fourth possible implementation of the third aspect, in a fifth possible implementation of the third aspect, when executing the corresponding network access policy after authentication on the core network device succeeds, the processor is specifically configured to: stop an attempt to access the 3GPP network, and attempt to access the 3GPP network again when a status of the terminal satisfies a first preset condition, where the first preset condition includes at least one of the following: a subscriber identity module (SIM) card of the terminal is changed, the terminal restarts, duration of timing starting when an attempt to access the 3GPP network by the terminal fails exceeds first preset duration, or the terminal reselects a non-3GPP network.

With reference to the fifth possible implementation of the third aspect, in a sixth possible implementation of the third aspect, the access request message further includes access point name (APN) information, the APN information is used to indicate a non-3GPP network that is requested by the terminal for use, and the core network device includes the ePDG; and when stopping an attempt to access the 3GPP network, and attempting to access the 3GPP network again when the status of the terminal satisfies the first preset condition, the processor is specifically configured to: if the ePDG belongs to a home public land mobile network (HPLMN), stop an attempt to access the 3GPP network, and attempt to access the 3GPP network again when the status of the terminal satisfies at least one of the following: a SIM card of the terminal is changed, the terminal restarts, duration of timing starting when an attempt to access the 3GPP network by the terminal fails exceeds the first preset duration, or the terminal attempts to access the 3GPP network again by using the non-3GPP network corresponding to the APN information; or if the ePDG belongs to a visited public land mobile network (VPLMN), after the non-3GPP network is reselected, attempt to access the 3GPP network by using the reselected non-3GPP network.

With reference to the fifth possible implementation of the third aspect, in a seventh possible implementation of the third aspect, the core network device does not include the ePDG, and the first preset condition includes: duration of timing starting when an attempt to access the 3GPP network by the terminal fails exceeds the first preset duration.

With reference to at least one of the first aspect, or the first possible implementation, the second possible implementation, the third possible implementation, the fourth possible implementation, the fifth possible implementation, the sixth possible implementation, or the seventh possible implementation of the first aspect, in an eighth possible implementation of the first aspect, the processor is further configured to: if authentication on the core network device fails, attempt to access the 3GPP network again; and if a preset quantity of times of attempts all fail, attempt to access the 3GPP network again after second preset duration.

According to a fourth aspect, a core network device is provided. The core network device includes a receiver, configured to receive an access request message sent by a terminal, where the access request message includes at least identity information of the terminal. The core network device also includes a processor, configured to send, by using a communications interface, an unauthorized access message to the terminal when determining, according to the identity information of the terminal, that the terminal has no permission to access the 3GPP network, where the unauthorized access message includes authentication information of the core network device, and the authentication information is used by the terminal to perform authentication on the core network device.

With reference to the fourth aspect, in a first possible implementation of the fourth aspect, if the core network device includes an evolved packet data gateway (ePDG), the authentication information includes certificate information and signature information of the ePDG; or the authentication information includes certificate information and signature information of the ePDG and an authentication vector set, where the authentication vector set includes a first parameter and a message authentication code (MAC); or if the core network device does not include an ePDG, the authentication information includes a first message digest, where the first message digest is generated by an HSS according to a preset algorithm, a failure message code carried in the unauthorized access message, and the identity information of the terminal; or the authentication information includes the authentication vector set.

It can be learnt from the foregoing technical solutions that, according to the processing method for terminal access to a 3GPP network provided in the embodiments of the present application, the terminal sends the access request message to the core network device on the 3GPP network, and the core network device obtains the unauthorized access message after determining that the terminal has no permission to access the 3GPP network. The unauthorized access message includes the authentication information of the core network device. The terminal performs authentication on the core network device according to the authentication information of the core network device, and executes the corresponding network access policy after authentication on the core network device by the terminal succeeds, that is, after the terminal determines that a source of the unauthorized access message is authorized, to reduce the quantity of access request messages that are sent to the core network device. This reduces load of the core network device, and further can improve efficiency of accessing the 3GPP network.

BRIEF DESCRIPTION OF THE DRAWINGS

The accompanying drawings, constituting a part of this application, in the specification are intended for further understanding of the present disclosure. Examples of embodiments and descriptions thereof in the present disclosure are intended to explain the present disclosure and do not constitute any improper limitation on the present disclosure. The following describes the accompanying drawings.

To describe the technical solutions in the embodiments of the present application or in the prior art more clearly, the following briefly describes the accompanying drawings required for describing the embodiments or the prior art. Apparently, a person of ordinary skill in the art may still derive other drawings from these accompanying drawings without creative efforts

DETAILED DESCRIPTION OF ILLUSTRATIVE EMBODIMENTS

The following first describes a core network device briefly before specific embodiments of the present application are detailed.

Figure 1:
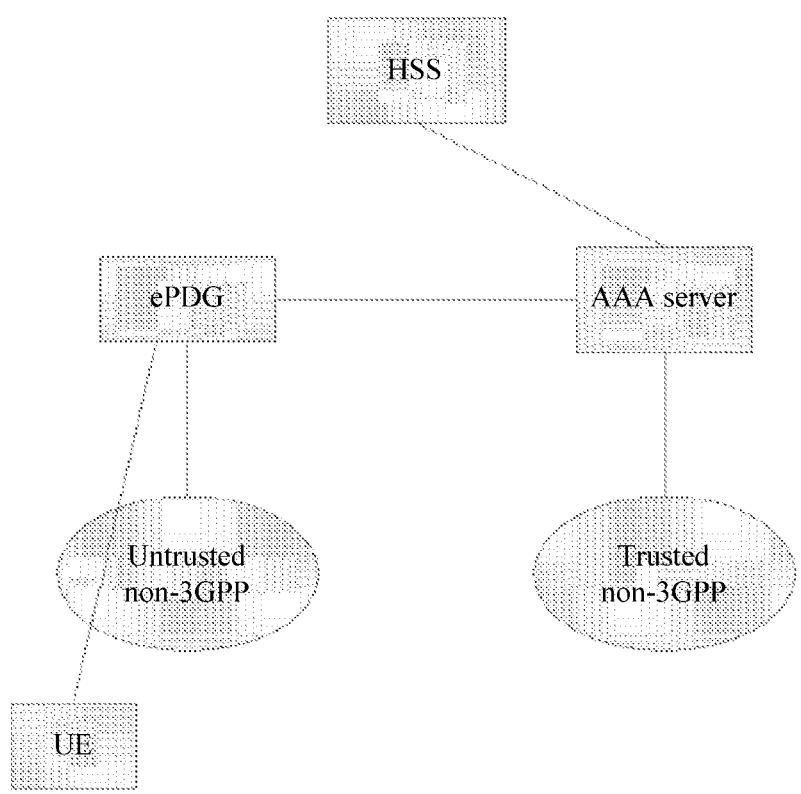
FIG. 1 is a schematic diagram of a core network of a 3GPP network in the prior art.

FIG. 1 is a schematic diagram of a core network. A core network device mainly includes an HSS (home subscriber server), an ePDG (evolved packet data gateway), and an AAA (Authentication, Authorization, and Accounting) server. The HSS is configured to determine whether UE is authorized to access a 3GPP network. In an application scenario in which the UE accesses the 3GPP network using a non-3GPP network, trusted non-3GPP network access and untrusted non-3GPP network access are supported from a perspective of the core network side. For example, a WLAN deployed by an operator is a trusted non-3GPP network, and a WLAN at a bookstore is an untrusted non-3GPP network. In an application scenario of untrusted non-3GPP network access, the UE needs to access the core network using the ePDG; therefore, in this application scenario, the core network device includes the ePDG, the AAA server, and the HSS. In an application scenario of trusted non-3GPP network access, the UE can access the core network without the ePDG; therefore, in this application scenario, the core network device includes the AAA server and the HSS. In an application scenario in which the UE directly accesses the 3GPP network, the UE may directly access the HSS; therefore, in this application scenario, the core network device includes at least the HSS.

The following clearly describes the technical solutions in the embodiments of the present application with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts shall fall within the protection scope of the present application.

Figure 2:
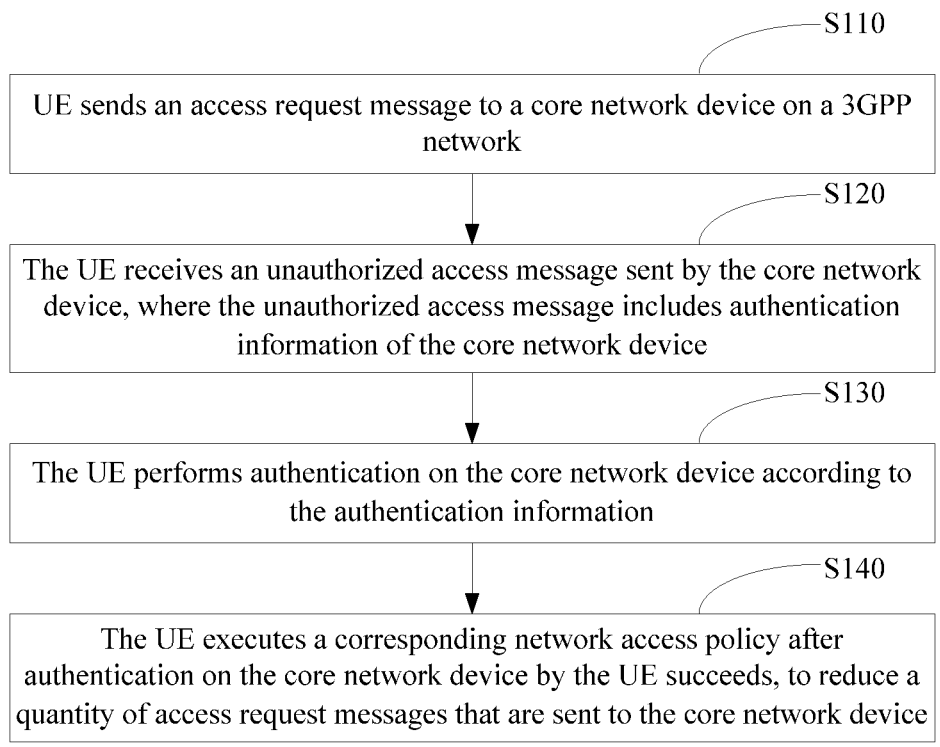
FIG. 2 is a flowchart of a processing method for terminal access to a 3GPP network according to an embodiment of the present application.

Referring to FIG. 2, FIG. 2 shows a flowchart of a processing method for UE access to a 3GPP network according to an embodiment of the present application. As shown in FIG. 2, the method is applied to UE, for example, a mobile phone. The method may include the following steps.

S110. The UE sends an access request message to a core network device on a 3GPP network.

The access request message includes identity information of the UE. The identity information of the UE is used to uniquely indicate the UE, and may be, for example, an IMSI (international mobile subscriber identity) of the UE.

When the UE accesses the 3GPP network by using a non-3GPP network, the access request message may further include APN (access point name) information. The APN information is used to indicate information about a non-3GPP network that is requested by the UE for use, for example, an ID (identity) of a WLAN.

S120. The UE receives an unauthorized access message sent by the core network device, where the unauthorized access message includes authentication information of the core network device.

The unauthorized access message further includes a failure message code. The failure message code is used to indicate why the UE is unauthorized to access the 3GPP network, for example, a service is suspended due to insufficient balance or there is no permission to access a network. The core network device informs, using the message, the UE of specific information that the UE is unauthorized to access the 3GPP network.

Different core network devices are corresponding to different authentication information. In an embodiment of the present application, when the core network device includes an ePDG, the authentication information may include authentication information of the ePDG, that is, certificate information and signature information of the ePDG; or, the authentication information of the core network device may include authentication information of the ePDG and authentication information of an HSS. The authentication information of the HSS includes an authentication vector set that is generated by the HSS when the HSS determines that the UE is unauthorized to access the 3GPP network. The authentication vector set includes the failure message code, a first parameter, and a MAC (message authentication code). In another embodiment of the present application, if the core network device does not include an ePDG, the authentication information includes a first message digest. The first message digest is generated by the HSS according to a preset algorithm, the failure message code, and the identity information of the UE. Alternatively, the authentication information includes the authentication vector set.

S130. The UE performs authentication on the core network device according to the authentication information.

The UE receives the unauthorized access message from the core network device, performs authentication on the core network device using the authentication information of the core network device included in the unauthorized access message, and determines whether the core network device is authorized, that is, whether a source of the unauthorized access message is authorized.

S140. The UE executes a corresponding network access policy after authentication on the core network device by the UE succeeds, to reduce a quantity of access request messages that are sent to the core network device.

If authentication on the core network device by the UE succeeds, that is, the UE determines that the source of the unauthorized access message is authorized, the UE attempts to access the 3GPP network according to the corresponding network access policy, to reduce a quantity of network access requests. This reduces the quantity of access request messages that are to be processed by the core network device, and reduces load of the core network device.

According to the processing method for terminal access to a 3GPP network provided in this embodiment, the UE sends the access request message to the core network device on the 3GPP network, and the core network device sends the unauthorized access message to the UE after determining that the UE has no permission to access the 3GPP network. The unauthorized access message includes the authentication information of the core network device. The UE performs authentication on the core network device according to the authentication information of the core network device, and executes the corresponding network access policy after authentication on the core network device by the UE succeeds, that is, after the UE determines that the source of the unauthorized access message is authorized, to reduce the quantity of access request messages that are sent to the core network device. This reduces the load of the core network device, and further can improve efficiency of accessing the 3GPP network.

Figure 3:
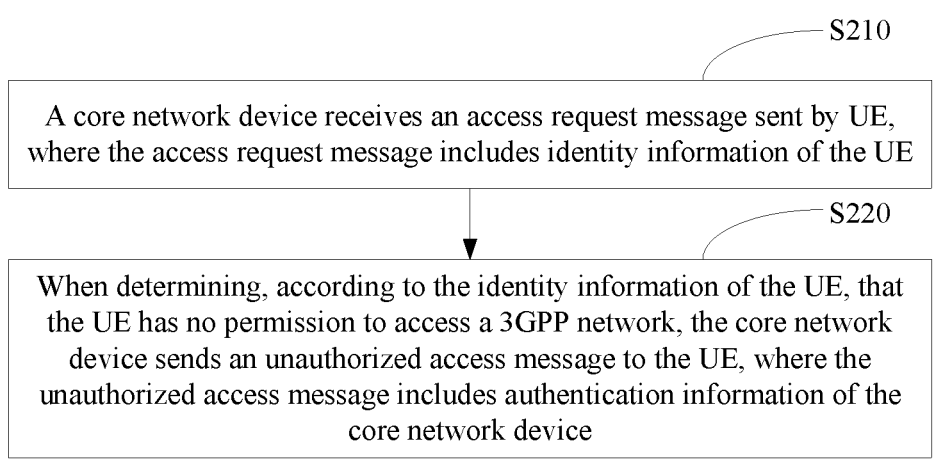
FIG. 3 is a flowchart of another processing method for terminal access to a 3GPP network according to an embodiment of the present application.

Referring to FIG. 3, FIG. 3 shows a flowchart of another processing method for UE access to a 3GPP network according to an embodiment of the present application. The method is applied to a core network device. As shown in FIG. 3, the method may include the following steps.

S210. The core network device receives an access request message sent by UE, where the access request message includes identity information of the UE.

In an application scenario in which the UE accesses a 3GPP network using a non-3GPP network, the access request message sent by the UE further includes APN information. An HSS obtains, according to the identity information of the UE, permission information of the UE, for example, whether a service is suspended due to insufficient balance; determines whether the UE is authorized to access the 3GPP network; and determines whether the UE has permission to use the non-3GPP network corresponding to the APN information. If the UE has permission to use the non-3GPP network corresponding to the APN information and the UE is authorized to access the 3GPP network, it is determined that the UE may use the non-3GPP network corresponding to the APN information. If either of the two conditions is not satisfied, it is determined that the UE is unauthorized to access the 3GPP network.

S220. When determining, according to the identity information of the UE, that the UE has no permission to access a 3GPP network, the core network device sends an unauthorized access message to the UE, where the unauthorized access message includes authentication information of the core network device.

Different core network devices are corresponding to different authentication information. This has been described in the foregoing, and details are not described herein again.

In an application scenario in which the 3GPP network is accessed using an untrusted non-3GPP network, if the HSS determines that the UE has no permission to access the 3GPP network, the HSS sends an unauthorized access message to an AAA server, the AAA server sends the unauthorized access message to an ePDG, and the ePDG adds authentication information of the ePDG to the unauthorized access message and then sends, to the UE, the unauthorized access message to which the authentication information of the ePDG is added.

In an application scenario in which the 3GPP network is accessed using a trusted non-3GPP network or an application scenario in which the 3GPP network is directly accessed, if determining that the UE has no permission to access the 3GPP network, the HSS generates an unauthorized access message, and may add authentication information of the HSS to the unauthorized access message and then send, to the UE, the unauthorized access message to which the authentication information of the HSS is added. The UE performs authentication on the core network device according to the authentication information of the core network device, and executes a corresponding network access policy after authentication on the core network device by the UE succeeds, to reduce a quantity of access request messages that are sent to the core network device. This reduces load of the core network device.

According to the processing method for UE access to a 3GPP network provided in this embodiment, the core network device determines, according to the identity information of the UE, whether the UE has permission to access the 3GPP network; and if determining that the UE does not have such permission, generates the unauthorized access message. The unauthorized access message carries the authentication information of the core network device. The UE performs authentication on the core network device according to the authentication information of the core network device, and executes the corresponding network access policy after authentication on the core network device by the UE succeeds, that is, after the UE determines that a source of the unauthorized access message is authorized, to reduce the quantity of access request messages that are sent to the core network device. This reduces the load of the core network device, and further improves efficiency of accessing the 3GPP network.

Figure 4A:
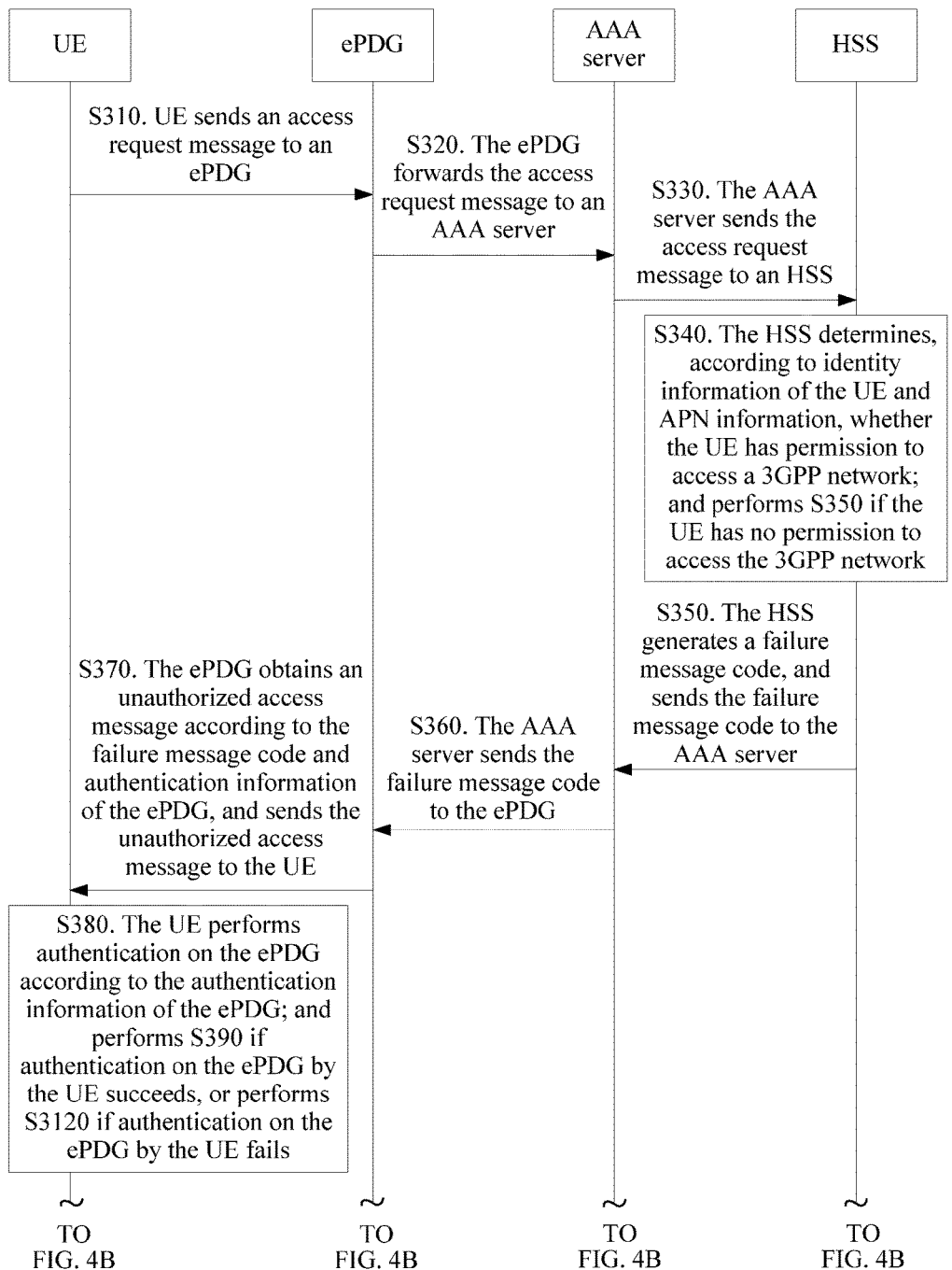
FIG. 4A and FIG. 4B are a flowchart of another processing method for terminal access to a 3GPP network according to an embodiment of the present application.
Figure 4B:
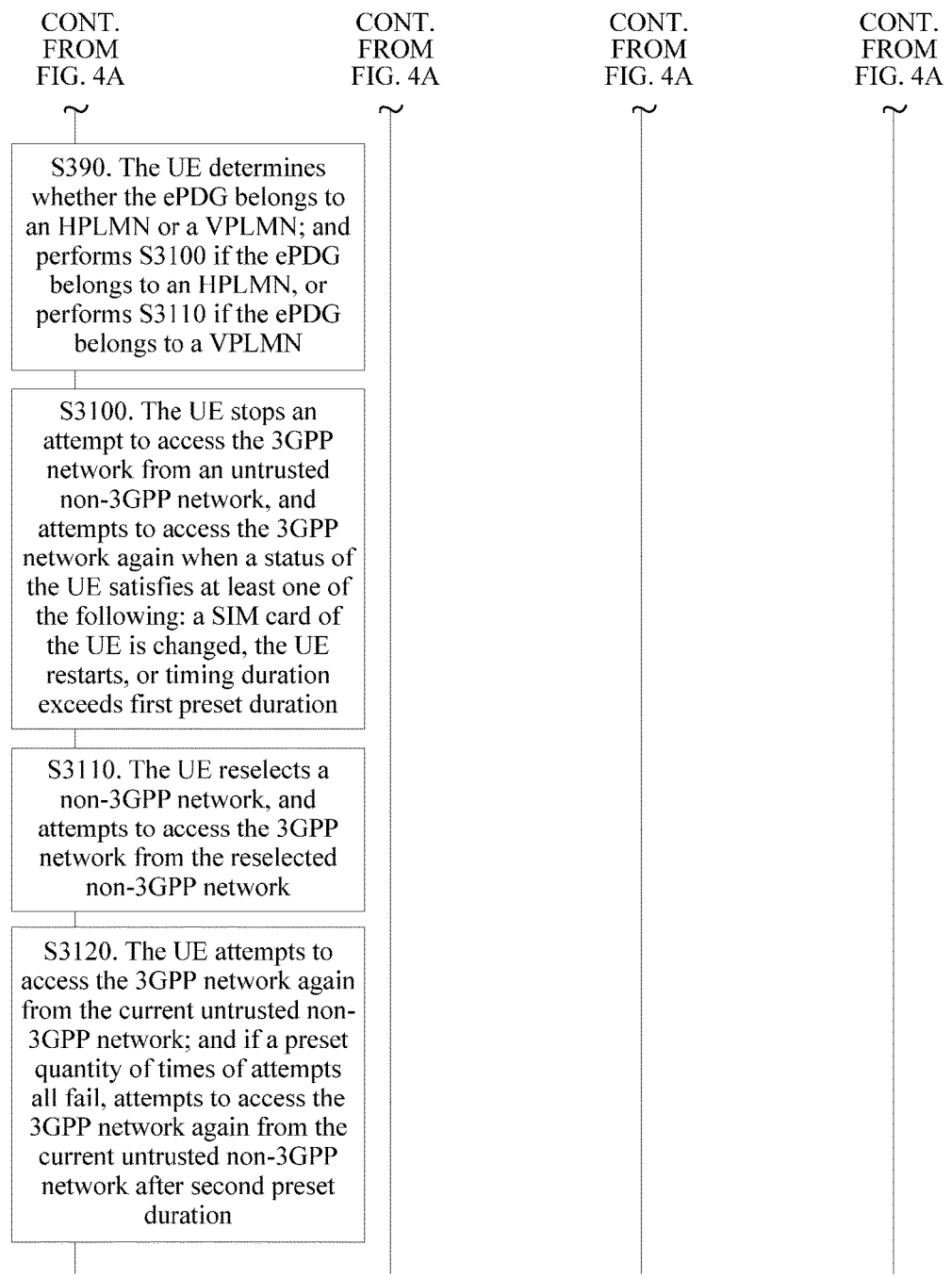

Referring to FIG. 4A and FIG. 4B, FIG. 4A and FIG. 4B show a flowchart of another processing method for terminal access to a 3GPP network according to an embodiment of the present application. The method is applied to an application scenario in which UE accesses a 3GPP network using an untrusted non-3GPP network, for example, the UE accesses the 3GPP network using an untrusted WLAN. As shown in FIG. 4A and FIG. 4B, the method may include the following steps.

S310. The UE sends an access request message to an ePDG.

In this embodiment, the access request message includes identity information of the UE and APN information. The APN information is used to indicate an untrusted non-3GPP network that is requested by the UE for use.

In specific implementation, before the UE sends the access request message to the ePDG, the UE and the ePDG exchange signaling IKEv2_SA_INIT, to negotiate an encryption algorithm and an encryption random number, and exchange D-H data used for generating a key.

Then, the UE sends the access request message to the ePDG, where the access request message is used to request to access the 3GPP network.

S320. The ePDG forwards the access request message to an AAA server.

S330. The AAA server sends the access request message to an HSS.

S340. The HSS determines, according to identity information of the UE and APN information, whether the UE has permission to access the 3GPP network; and performs S350 if the UE has no permission to access the 3GPP network.

The HSS obtains, according to the identity information of the UE, permission information of the UE, for example, whether a service is suspended due to insufficient balance; determines whether the UE is authorized to access the 3GPP network; and determines whether the UE has permission to use the non-3GPP network corresponding to the APN information. If the UE has permission to use the non-3GPP network corresponding to the APN information and the UE is authorized to access the 3GPP network, it is determined that the UE may use the non-3GPP network corresponding to the APN information. If either of the two conditions is not satisfied, it is determined that the UE is unauthorized to access the 3GPP network.

S350. The HSS generates a failure message code, and sends the failure message code to the AAA server.

When determining that the UE is unauthorized to access the 3GPP network, the HSS generates a corresponding failure message code, and sends the failure message code to the UE using the AAA server and the ePDG.

S360. The AAA server sends the failure message code to the ePDG.

S370. The ePDG obtains an unauthorized access message according to the failure message code and authentication information of the ePDG, and sends the unauthorized access message to the UE.

After receiving the failure message code, the ePDG adds the authentication information of the ePDG to the failure message code, and then sends, to the UE, the failure message code to which the authentication information of the ePDG is added. The authentication information of the ePDG includes a certificate and signature information. The signature information is AUTH (authentication) information.

S380. The UE performs authentication on the ePDG according to the authentication information of the ePDG; and performs S390 if authentication on the ePDG by the UE succeeds, or performs S3120 if authentication on the ePDG by the UE fails.

The UE verifies authenticity of the certificate and the AUTH information of the ePDG. In specific implementation, the UE obtains an identity of the ePDG, obtains a certificate of the ePDG from a certificate authority according to the identity of the ePDG, and determines, by means of comparison, whether the obtained certificate of the ePDG is the same as the received certificate of the ePDG. The AUTH information is used to describe an authentication manner and authentication content.

If both the certificate and the AUTH information of the ePDG are correct, it is determined that authentication on the ePDG succeeds, that is, it is determined that the ePDG is an authorized device. If either of the certificate and the AUTH information of the ePDG is incorrect, it is determined that authentication on the ePDG fails, and the ePDG is deemed as an unauthorized device, that is, a source of the unauthorized access message is unauthorized.

S390. The UE determines whether the ePDG belongs to an HPLMN (home public land mobile network) or a VPLMN (visited public land mobile network); and performs S3100 if the ePDG belongs to an HPLMN, or performs S3110 if the ePDG belongs to a VPLMN.

The UE may determine, according to information in an FQDN (fully qualified domain name) message of the ePDG, whether the ePDG is an ePDG deployed using the HPLMN or an ePDG deployed using the VPLMN.

S3100. The UE stops an attempt to access the 3GPP network from the untrusted non-3GPP network, and attempts to access the 3GPP network again when a status of the UE satisfies at least one of the following: a SIM (subscriber identity module) card of the UE is changed, the UE restarts, or duration of timing starting when an attempt to access the 3GPP network by the UE fails exceeds first preset duration.

Timing starts when an attempt to access the 3GPP network by the UE fails, and the UE attempts to access the 3GPP network again after the timing duration reaches the first preset duration.

When the status of the UE satisfies at least one of the foregoing statuses, the UE attempts to access the 3GPP network from the current untrusted non-3GPP network.

The current untrusted non-3GPP network is an untrusted non-3GPP network that is requested by the UE for use, that is, the untrusted non-3GPP network corresponding to the APN information.

S3110. The UE reselects a non-3GPP network, and attempts to access the 3GPP network from the reselected non-3GPP network.

If determining that the ePDG belongs to the VPLMN, the UE reselects a non-3GPP network (including a trusted non-3GPP network and an untrusted non-3GPP network), and attempts to access the 3GPP network using the reselected non-3GPP network.

S3120. The UE attempts to access the 3GPP network again from the current untrusted non-3GPP network; and if a preset quantity of times of attempts all fail, attempts to access the 3GPP network again from the current untrusted non-3GPP network after second preset duration.

If authentication on the ePDG by the UE fails, that is, the UE determines that the ePDG is an unauthorized device, the UE attempts to access the 3GPP network from the current untrusted non-3GPP network; and starts a first timer after a preset quantity of times of attempts all fail. Before timing duration of the first timer reaches the second preset duration, the UE does not attempt to access the 3GPP network from the current untrusted non-3GPP network. After the timing duration of the first timer exceeds the second preset duration, the UE attempts to access the 3GPP network again from the current untrusted non-3GPP network, and restarts the first timer after a preset quantity of times of attempts all fail.

The current untrusted non-3GPP network is the non-3GPP network that is currently used by the UE to attempt to access the 3GPP network. Numeric values of both the preset quantity of times and the second preset duration may be flexibly set by a home operator according to actual requirements.

The processing method for terminal access to a 3GPP network provided in this embodiment is applied to an application scenario in which the 3GPP network is accessed using the untrusted non-3GPP network. When determining that the UE has no permission to access the 3GPP network, the HSS generates the failure message code, and sends the failure message code to the ePDG. The ePDG obtains the unauthorized access message according to the failure message code and the authentication information of the ePDG, and sends the unauthorized access message to the UE. The UE determines, according to the authentication information of the ePDG, whether the ePDG is an authorized device; and if determining that the ePDG is an authorized device, the UE does not attempt to access the 3GPP network again until the status of the UE satisfies the corresponding condition, to reduce a quantity of access request messages that are sent to a core network device. This reduces load of the core network device, and further improves efficiency of accessing the 3GPP network by the terminal.

Figure 5A:
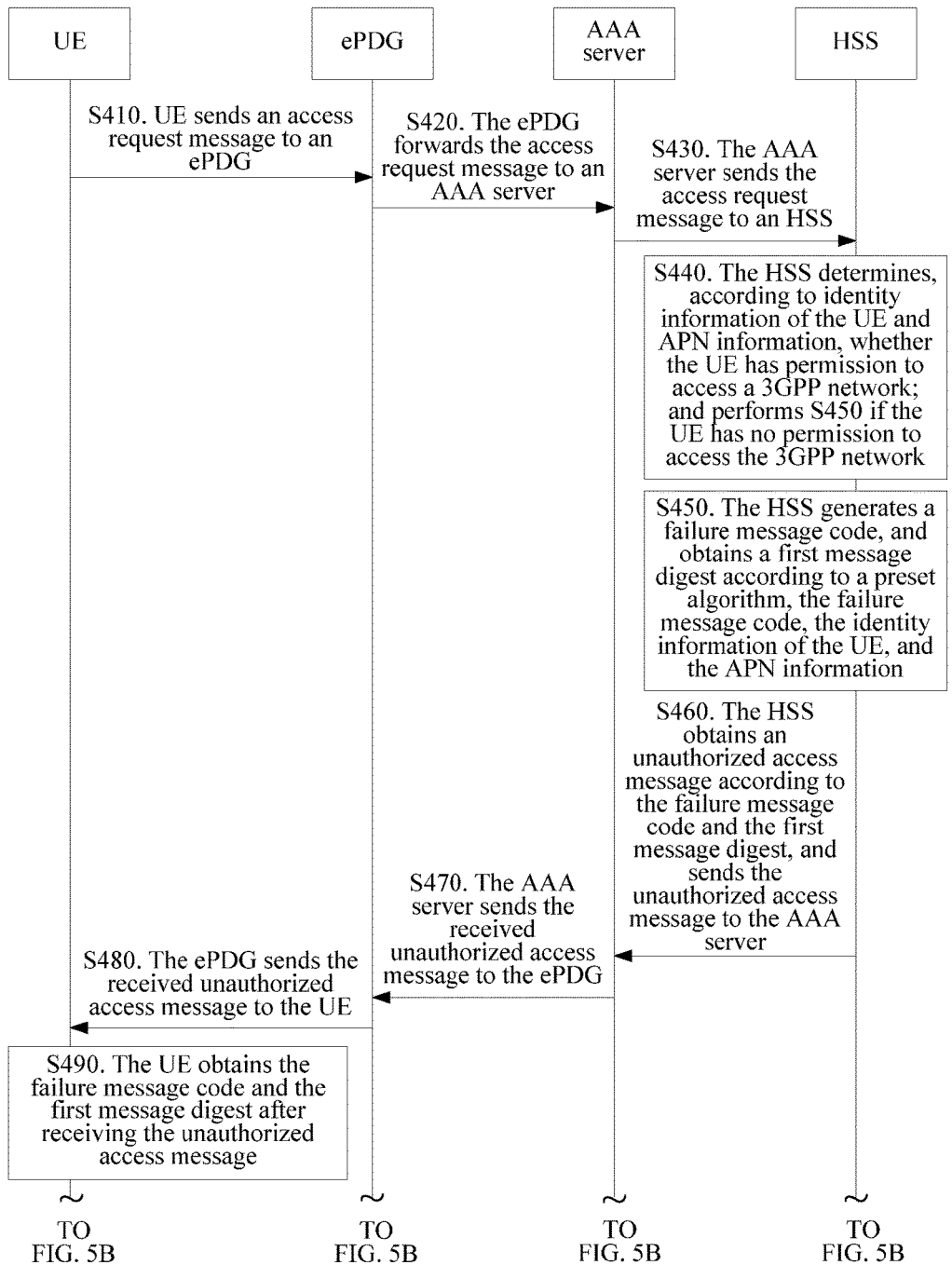
FIG. 5A and FIG. 5B are a flowchart of another processing method for terminal access to a 3GPP network according to an embodiment of the present application.
Figure 5B:

Referring to FIG. 5A and FIG. 5B, FIG. 5A and FIG. 5B show a flowchart of another processing method for terminal access to a 3GPP network according to an embodiment of the present application. The method may be applied to an application scenario in which UE accesses a 3GPP network using an untrusted non-3GPP network. As shown in FIG. 5A and FIG. 5B, the method may include the following steps.

S410. The UE sends an access request message to an ePDG.

In this embodiment, the access request message includes at least identity information of the UE and APN information. The APN information is used to indicate an untrusted non-3GPP network that is requested by the UE for use.

S420. The ePDG forwards the access request message to an AAA server.

S430. The AAA server sends the access request message to an HSS.

S440. The HSS determines, according to identity information of the UE and APN information, whether the UE has permission to access the 3GPP network; and performs S450 if the UE has no permission to access the 3GPP network.

S450. The HSS generates a failure message code, and obtains a first message digest according to a preset algorithm, the failure message code, the identity information of the UE, and the APN information.

In an embodiment of the present application, the HSS may input the identity information of the UE, the APN information, and the failure message code to the preset algorithm, to obtain the first message digest. The preset algorithm may be an integrity protection algorithm, for example, a Hash-256 algorithm.

In another embodiment of the present application, the HSS obtains the first message digest according to the preset algorithm, the identity information of the UE, the APN information, the failure message code, and other information.

S460. The HSS obtains an unauthorized access message according to the failure message code and the first message digest, and sends the unauthorized access message to the AAA server.

The HSS uses the generated first message digest and failure message code as the unauthorized access message, and sends the unauthorized access message to the UE.

S470. The AAA server sends the received unauthorized access message to the ePDG.

S480. The ePDG sends the received unauthorized access message to the UE.

S490. The UE obtains the failure message code and the first message digest after receiving the unauthorized access message.

S4100. The UE obtains a second message digest according to the preset algorithm, the failure message code, the identity information of the UE, and the APN information.

The UE generates the second message digest using the method in which the HSS generates the first message digest.

S4110. The UE determines, by means of comparison, whether the first message digest is the same as the second message digest; and performs S4120 if the first message digest is the same as the second message digest, or performs S4160 if the first message digest is different from the second message digest.

S4120. The UE determines that authentication on the HSS succeeds, that is, the UE determines that the HSS is an authorized device.

S4130. The UE determines whether the ePDG belongs to an HPLMN or a VPLMN; and performs S4140 if the ePDG belongs to an HPLMN, or performs S4150 if the ePDG belongs to a VPLMN.

After determining that the HSS is an authorized device, the UE needs to determine the network to which the ePDG belongs. This has been described in the foregoing, and details are not described herein again.

S4140. The UE stops an attempt to access the 3GPP network from the untrusted non-3GPP network, and attempts to access the 3GPP network again when a status of the UE satisfies at least one of the following: a SIM card of the UE is changed, the UE restarts, or timing duration exceeds first preset duration.

Timing starts when an attempt to access the 3GPP network by the UE fails, and the UE attempts to access the 3GPP network again after the timing duration reaches the first preset duration.

S4150. The UE reselects a non-3GPP network, and attempts to access the 3GPP network from the reselected non-3GPP network.

If determining that the ePDG belongs to the VPLMN, the UE reselects a non-3GPP network (including a trusted non-3GPP network and an untrusted non-3GPP network), and attempts to access the 3GPP network using the reselected non-3GPP network.

S4130 to S4150 are the same as S390 to S3110 in the embodiment in FIG. 4A and FIG. 4B, and are not elaborated herein.

S4160. The UE attempts to access the 3GPP network again from the current untrusted non-3GPP network; and if a preset quantity of times of attempts all fail, attempts to access the 3GPP network again from the current untrusted non-3GPP network after second preset duration.

The current untrusted non-3GPP network is an untrusted non-3GPP network that is requested by the UE for use, that is, the untrusted non-3GPP network corresponding to the APN information.

If authentication on the HSS by the UE fails, that is, the UE determines that the HSS is an unauthorized device, the UE attempts to access the 3GPP network again from the current untrusted non-3GPP network; and starts a first timer after a preset quantity of times of attempts all fail. Before timing duration of the first timer reaches the second preset duration, the UE does not attempt to access the 3GPP network from the current untrusted non-3GPP network. After the timing duration of the first timer exceeds the second preset duration, the UE attempts to access the 3GPP network again from the current untrusted non-3GPP network, and restarts the first timer after a preset quantity of times of attempts all fail.

Numeric values of both the preset quantity of times and the second preset duration may be flexibly set by a home operator according to actual requirements.

According to the processing method for terminal access to a 3GPP network provided in this embodiment, after determining that the UE has no permission to access the 3GPP network, the HSS obtains the first message digest according to the preset algorithm, the failure message code, the identity information of the UE, and the APN information, uses the first message digest and the failure message code as the unauthorized access message, and sends the unauthorized access message to the UE. After receiving the unauthorized access message, the UE generates the second message digest using the method that is the same as that used for generating the first message digest; the UE performs authentication on the HSS by comparing the first message digest with the second message digest; and executes a corresponding network access policy according to the unauthorized access message if authentication on the HSS succeeds, to reduce a quantity of network access requests that are sent to a core network device. This reduces load of the core network device, and further improves efficiency of accessing the 3GPP network by the terminal.

In addition, in the processing method for terminal access to a 3GPP network provided in this embodiment shown in FIG. 5A and FIG. 5B, the HSS directly adds, to the unauthorized access message, the first message digest used by the UE to verify whether the HSS is an authorized device, so that the UE does not need to perform authentication on the ePDG. Therefore, a manner of performing authentication on the HSS using a message digest may be applied to an application scenario in which the ePDG is not required. For example, the 3GPP network is accessed using a trusted non-3GPP network or the 3GPP network is directly accessed. In an application scenario in which the ePDG is required, steps of performing authentication on the HSS by the UE using a message digest are the same as related steps in FIG. 5A and FIG. 5B. Details are not described herein again.

If authentication on the HSS succeeds, before timing duration reaches the first preset duration, the UE does not attempt to access the 3GPP network. After the timing duration exceeds the first preset duration, the UE attempts to access the 3GPP network. Timing starts when an attempt to access the 3GPP network by the UE fails, and the UE attempts to access the 3GPP network again after the timing duration reaches the first preset duration. If authentication on the HSS fails, the UE attempts to access the 3GPP network. Timing starts when the preset quantity of times of attempts all fail. After timing duration reaches the second preset duration, the UE attempts to access the 3GPP network again.

Figure 6A:
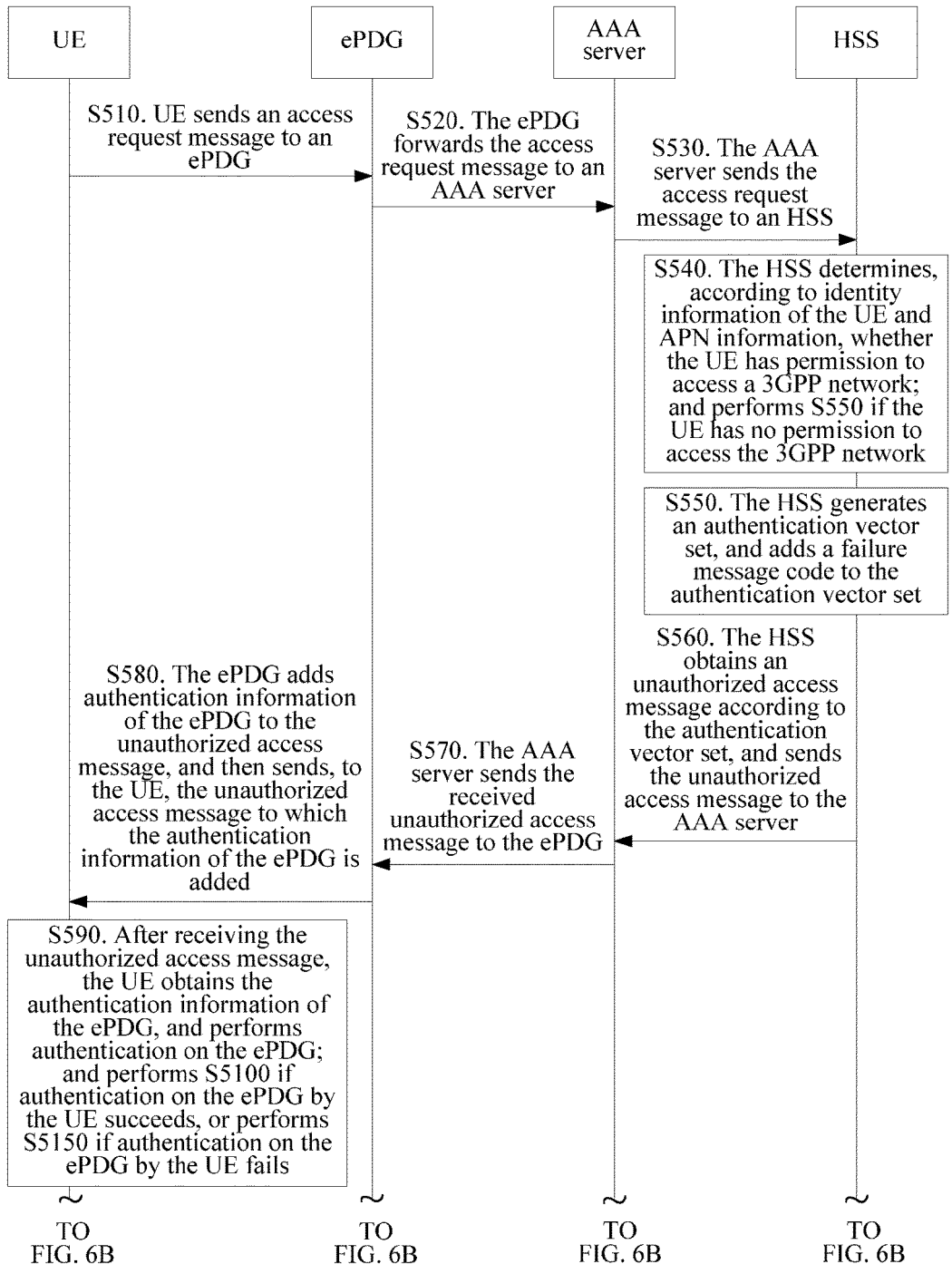
FIG. 6A and FIG. 6B are a flowchart of another processing method for terminal access to a 3GPP network according to an embodiment of the present application.
Figure 6B:
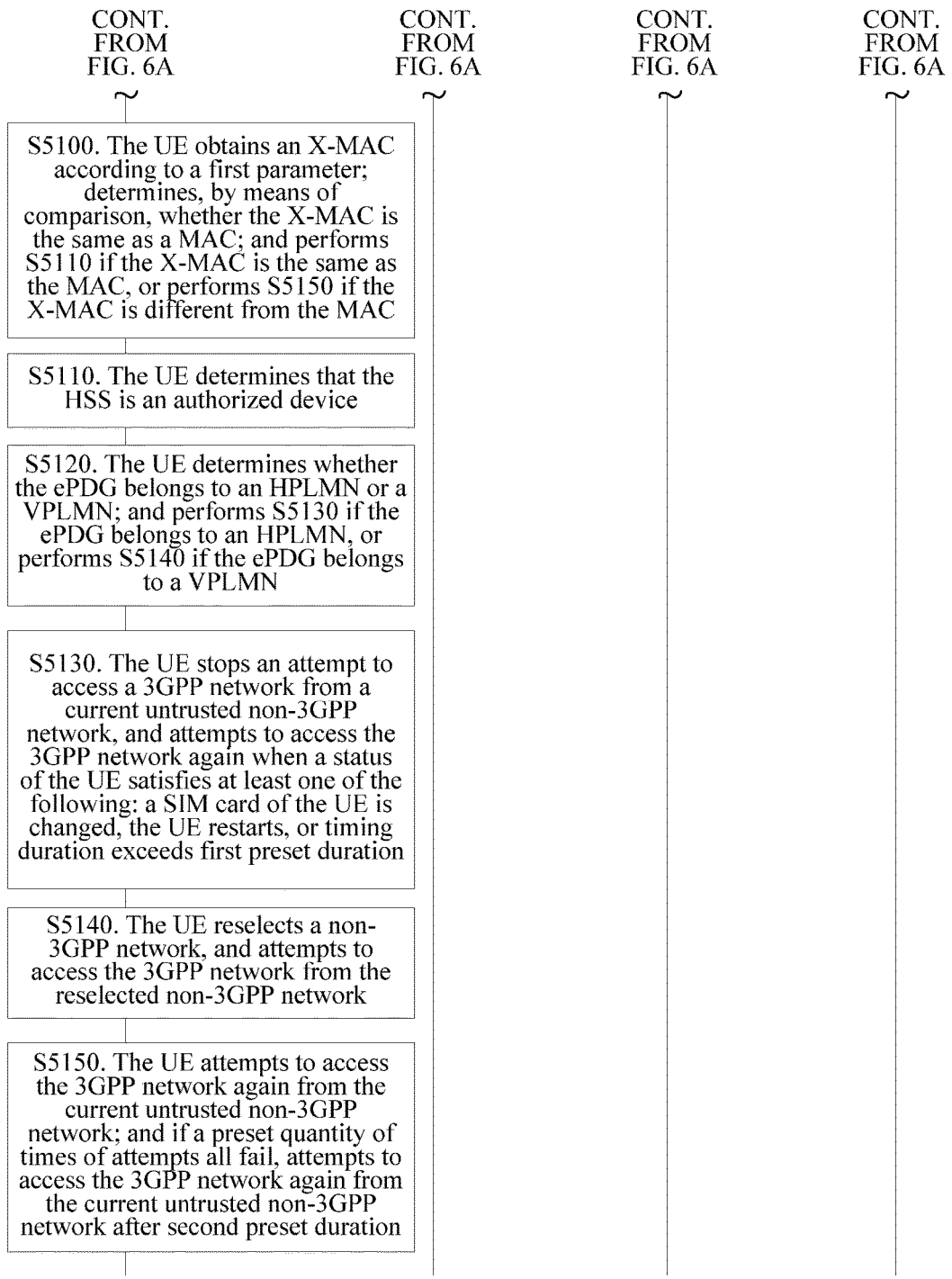

Referring to FIG. 6A and FIG. 6B, FIG. 6A and FIG. 6B show a flowchart of another processing method for terminal access to a 3GPP network according to an embodiment of the present application. The method may be applied to an application scenario in which a 3GPP network is accessed using an untrusted non-3GPP network. As shown in FIG. 6A and FIG. 6B, the method may include the following steps.

S510. UE sends an access request message to an ePDG.

The access request message includes at least identity information of the UE and APN information. In this embodiment, the APN information is used to indicate information about an untrusted non-3GPP network that is requested by the UE for use.

S520. The ePDG forwards the access request message to an AAA server.

S530. The AAA server sends the access request message to an HSS.

S540. The HSS determines, according to identity information of the UE and APN information, whether the UE has permission to access the 3GPP network; and performs S550 if the UE has no permission to access the 3GPP network.

S550. The HSS generates an authentication vector set, and adds a failure message code to the authentication vector set.

In this embodiment of the present application, the authentication vector set includes an AMF (authentication management field), a first parameter, and a MAC. The failure message code may be copied into the AMF, and the AMF is used as a carrier for sending the failure message code. The first parameter is used to generate an X-MAC (expected message authentication code).

The AMF is a part of the authentication vector set and has 16 bits in total. A $0^{th}$ bit is a separation bit, and is mainly used to distinguish whether an authentication parameter of the HSS is used for a UMTS (Universal Mobile Telecommunications System) network or an LTE (Long Term Evolution) network. The $0^{th}$ bit is "0" if a UMTS network is used, or the $0^{th}$ bit is "1" if an LTE network is used. Another bit of the AMF may be used to store the failure message code.

The first parameter may include a key and a random number; in this case, the UE generates the X-MAC according to the random number and the key. Alternatively, the first parameter includes at least a random number and a key may be generated by the UE; in this case, the UE generates the X-MAC according to the key and the random number.

S560. The HSS sends an unauthorized access message to the AAA server, where the unauthorized access message includes the authentication vector set.

After sending the unauthorized access message to the AAA server, the HSS deletes the authentication vector set, so as to save storage space of the HSS.

S570. The AAA server sends the received unauthorized access message to the ePDG.

S580. The ePDG adds authentication information of the ePDG to the unauthorized access message, and then sends, to the UE, the unauthorized access message to which the authentication information of the ePDG is added.

The authentication information of the ePDG includes a certificate and AUTH information of the ePDG.

S590. After receiving the unauthorized access message, the UE obtains the authentication information of the ePDG, and performs authentication on the ePDG; and performs S5100 if authentication on the ePDG by the UE succeeds, or performs S5150 if authentication on the ePDG by the UE fails.

For a process in which the UE performs authentication on the ePDG, refer to related content of the embodiment in FIG. 4A and FIG. 4B. Details are not described herein again.

After receiving the unauthorized access message, the UE first performs authentication on the ePDG. After authentication on the ePDG succeeds, authentication is performed on the HSS; otherwise, after authentication on the ePDG fails, authentication does not need to be performed on the HSS.

S5100. The UE obtains an X-MAC according to a first parameter; determines, by means of comparison, whether the X-MAC is the same as a MAC; and performs S5110 if the X-MAC is the same as the MAC, or performs S5150 if the X-MAC is different from the MAC.

S5110. The UE determines that the HSS is an authorized device. That is, the UE determines that the unauthorized access message comes from an authorized device.

S5120. The UE determines whether the ePDG belongs to an HPLMN or a VPLMN; and performs S5130 if the ePDG belongs to an HPLMN, or performs S5140 if the ePDG belongs to a VPLMN.

After authentication on the HSS by the UE succeeds, a corresponding network access policy needs to be executed according to the network to which the ePDG belongs.

S5130. The UE stops an attempt to access the 3GPP network from the current untrusted non-3GPP network, and attempts to access the 3GPP network again when a status of the UE satisfies at least one of the following: a SIM card of the UE is changed, the UE restarts, or timing duration exceeds first preset duration.

Timing starts when an attempt to access the 3GPP network by the UE fails, and the UE attempts to access the 3GPP network again after the timing duration reaches the first preset duration.

S5140. The UE reselects a non-3GPP network, and attempts to access the 3GPP network from the reselected non-3GPP network.

If determining that the ePDG belongs to the VPLMN, the UE reselects a non-3GPP network (including a trusted non-3GPP network and an untrusted non-3GPP network), and attempts to access the 3GPP network using the reselected non-3GPP network.

S5120 to S5140 are the same as S390 to S3110 in the embodiment in FIG. 4A and FIG. 4B, and are not elaborated herein.

S5150. The UE determines that authentication on a source of the unauthorized access message fails; attempts to access the 3GPP network again from the current untrusted non-3GPP network; and if a preset quantity of times of attempts all fail, attempts to access the 3GPP network again from the current untrusted non-3GPP network after second preset duration.

If authentication on the ePDG by the UE fails or authentication on the HSS by the UE fails, that is, the UE determines that the unauthorized access message comes from an unauthorized device, the UE attempts to access the 3GPP network again from the current untrusted non-3GPP network; and starts a first timer after a preset quantity of times of attempts all fail. Before timing duration of the first timer reaches the second preset duration, the UE does not attempt to access the 3GPP network from the current untrusted non-3GPP network. After the timing duration of the first timer exceeds the second preset duration, the UE attempts to access the 3GPP network again from the current untrusted non-3GPP network, and restarts the first timer after a preset quantity of times of attempts all fail.

Numeric values of both the preset quantity of times and the second preset duration may be flexibly set by a home operator according to actual requirements.

According to the processing method for terminal access to a 3GPP network provided in this embodiment, after determining that the UE has no permission to access the 3GPP network, the HSS generates the authentication vector set, and adds the failure message code to the authentication vector set. After receiving the authentication vector set sent by the HSS, the UE determines, according to the parameters in the authentication vector set, whether the HSS is an authorized device; and executes the corresponding network access policy if the HSS is an authorized device, to reduce a quantity of network access requests that are sent to a core network device. This reduces load of the core network device, and further can improve efficiency of accessing the 3GPP network by the terminal.

In addition, in the processing method for terminal access to a 3GPP network provided in this embodiment, after determining that the UE has no permission to access the 3GPP network, the HSS generates the authentication vector set. The UE may perform authentication on the HSS directly using the authentication vector set. The method may be applied to an application scenario in which the ePDG is not required. For example, the 3GPP network is accessed using a trusted non-3GPP network or the 3GPP network is directly accessed. For a process in which the UE performs authentication on the HSS using the authentication vector set, refer to related content of the embodiment in FIG. 6A and FIG. 6B. Details are not described herein again.

In an application scenario in which the 3GPP network is accessed using a trusted non-3GPP network or the 3GPP network is directly accessed, if authentication on the HSS by the UE according to the authentication vector set succeeds, before timing duration of the first timer reaches the second preset duration, the UE does not attempt to access the 3GPP network. After the timing duration exceeds the first preset duration, the UE attempts to access the 3GPP network. Timing starts when an attempt to access the 3GPP network by the UE fails, and the UE attempts to access the 3GPP network again after the timing duration reaches the first preset duration. If authentication on the HSS fails, the UE attempts to access the 3GPP network. Timing starts when the preset quantity of times of attempts all fail. After timing duration reaches the second preset duration, the UE attempts to access the 3GPP network again.

Corresponding to the foregoing embodiment, applied to the terminal, of the processing method for terminal access to a 3GPP network, the present application further provides a terminal embodiment.

Figure 7:
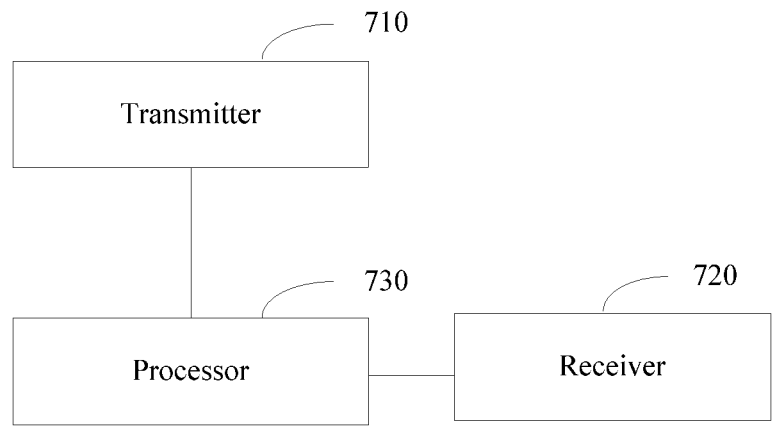
FIG. 7 is a block diagram of a terminal according to an embodiment of the present application.

Referring to FIG. 7, FIG. 7 shows a block diagram of a terminal according to an embodiment of the present application. As shown in FIG. 7, the terminal includes a transmitter 710, a receiver 720, and a processor 730.

The transmitter 710 is configured to send an access request message to a core network device on a 3rd Generation Partnership Project (3GPP) network, where the access request message is used to request to access the 3GPP network, and the access request message includes identity information of the terminal.

The receiver 720 is configured to receive an unauthorized access message sent by the core network device, where the unauthorized access message is used to indicate that the terminal is unauthorized to access the 3GPP network.

The processor 730 is configured to: perform authentication on the core network device according to the authentication information; and execute a corresponding network access policy after authentication on the core network device succeeds, to reduce a quantity of access request messages that are sent by the terminal to the core network device.

In a specific embodiment of the present application, if authentication on the core network device succeeds, the processor 730 is specifically configured to: stop an attempt to access the 3GPP network, and attempt to access the 3GPP network again when a status of the terminal satisfies a first preset condition, where the first preset condition includes at least one of the following: a subscriber identity module (SIM) card of the terminal is changed, the terminal restarts, duration of timing starting when an attempt to access the 3GPP network by the terminal fails exceeds first preset duration, or the terminal reselects a non-3GPP network.

If authentication on the core network device fails, the processor 730 is specifically configured to: if authentication on the core network device fails, attempt to access the 3GPP network again; and if a preset quantity of times of attempts all fail, attempt to access the 3GPP network again after second preset duration.

According to the terminal provided in this embodiment, the transmitter sends the access request message to the core network device on the 3GPP network, and the core network device sends the unauthorized access message to the terminal after determining that the terminal has no permission to access the 3GPP network. The unauthorized access message includes the authentication information of the core network device. After receiving the unauthorized access message using the receiver, the terminal performs authentication on the core network device according to the authentication information of the core network device, and executes the corresponding network access policy after authentication on the core network device by the terminal succeeds, that is, after the terminal determines that a source of the unauthorized access message is authorized, to reduce the quantity of access request messages that are sent to the core network device. This reduces load of the core network device, and further can improve efficiency of accessing the 3GPP network.

In an embodiment of the present application, the authentication information received by the terminal includes a first message digest, where the first message digest is generated by an HSS and is used by the terminal to perform authentication on the HSS. This embodiment may be applied to an application scenario in which the terminal accesses the 3GPP network using an untrusted non-3GPP network, accesses the 3GPP network using a trusted 3GPP network, or directly accesses the 3GPP network.

In this embodiment, when performing authentication on the core network device according to the authentication information, the processor 730 is specifically configured to: generate a second message digest according to a preset algorithm, the identity information of the terminal, and a failure message code carried in the unauthorized access message; and if the first message digest is the same as the second message digest, determine that authentication on the HSS succeeds; or if the first message digest is different from the second message digest, determine that authentication on the HSS fails.

According to the terminal provided in this embodiment, after determining that the terminal has no permission to access the 3GPP network, the HSS obtains the first message digest according to the preset algorithm, the failure message code, the identity information of the terminal, and APN information, uses the first message digest and the failure message code as the unauthorized access message, and sends the unauthorized access message to the terminal. After receiving the unauthorized access message, the terminal generates the second message digest using the method that is the same as that used for generating the first message digest; the terminal performs authentication on the HSS by comparing the first message digest with the second message digest; and executes the corresponding network access policy according to the unauthorized access message if authentication on the HSS succeeds, to reduce a quantity of network access requests that are sent to the core network device. This reduces the load of the core network device, and further improves efficiency of accessing the 3GPP network by the terminal.

In another embodiment of the present application, after authentication by the terminal fails, the HSS still generates an authentication vector set, so that the terminal performs authentication on the HSS according to the authentication vector set. This embodiment may be applied to an application scenario in which the terminal accesses the 3GPP network using an untrusted non-3GPP network, accesses the 3GPP network using a trusted 3GPP network, or directly accesses the 3GPP network. In this embodiment, the authentication information includes the authentication vector set. The authentication vector set includes a first parameter and a message authentication code (MAC), and the first parameter is used to generate an expected message authentication code (X-MAC); and when performing authentication on the core network device according to the authentication information, the processor 730 is specifically configured to: generate the X-MAC according to the first parameter; and if the X-MAC is the same as the MAC, determine that authentication on the HSS succeeds; or if the X-MAC is different from the MAC, determine that authentication on the HSS fails.

According to the terminal provided in this embodiment, after determining that the terminal has no permission to access the 3GPP network, the HSS generates the authentication vector set, and adds the failure message code to the authentication vector set. After receiving the authentication vector set sent by the HSS, the terminal determines, according to the parameters in the authentication vector set, whether the HSS is an authorized device; and executes the corresponding network access policy if the HSS is an authorized device, to reduce the quantity of network access requests that are sent to the core network device. This reduces the load of the core network device, and further can improve efficiency of accessing the 3GPP network by the terminal.

In another embodiment of the present application, the authentication information includes certificate information and signature information of an ePDG. This embodiment is applied to an application scenario in which the terminal accesses the 3GPP network using an untrusted non-3GPP network, that is, an application scenario in which the core network device includes the ePDG.

When performing authentication on the core network device according to the authentication information, the processor 730 is specifically configured to: if both the certificate information and the signature information of the ePDG are correct, determine that authentication on the ePDG succeeds; or if the certificate information or the signature information of the ePDG is incorrect, determine that authentication on the ePDG fails.

The terminal provided in this embodiment is applied to the application scenario in which the 3GPP network is accessed using the untrusted non-3GPP network. When determining that the terminal has no permission to access the 3GPP network, the HSS generates the failure message code, and sends the failure message code to the ePDG. The ePDG obtains the unauthorized access message according to the failure message code and the authentication information of the ePDG, and sends the unauthorized access message to the terminal. The terminal determines, according to the authentication information of the ePDG, whether the ePDG is an authorized device; and if determining that the ePDG is an authorized device, before the status of the terminal satisfies the corresponding condition, the terminal does not attempt to access the 3GPP network again, to reduce the quantity of access request messages that are sent to the core network device. This reduces the load of the core network device, and further improves efficiency of accessing the 3GPP network by the terminal.

In another embodiment of the present application, the authentication information further includes an authentication vector set, the authentication vector set includes a first parameter and a MAC, and the first parameter is used to generate an X-MAC. This embodiment is applied to an application scenario in which the core network device includes an ePDG. When performing authentication on the core network device according to the authentication information, the processor 730 is specifically configured to: if both certificate information and signature information of the ePDG are correct, determine that authentication on the ePDG succeeds; or if certificate information or signature information of the ePDG is incorrect, determine that authentication on the ePDG fails; generate the X-MAC according to the first parameter when authentication on the ePDG succeeds; and if the X-MAC is the same as the MAC, determine that authentication on the HSS succeeds; or if the X-MAC is different from the MAC, determine that authentication on the HSS fails.

In an application scenario of the present application, the terminal accesses the 3GPP network using an untrusted non-3GPP network. In this application scenario, the core network device includes an ePDG, the access request message sent by the terminal further includes access point name APN information, and the APN information is used to indicate a non-3GPP network that is requested by the terminal for use. When stopping an attempt to access the 3GPP network, and attempting to access the 3GPP network again when the status of the terminal satisfies the first preset condition, the processor 730 is specifically configured to: if the ePDG belongs to an HPLMN, stop an attempt to access the 3GPP network, and attempt to access the 3GPP network again when the status of the terminal satisfies at least one of the following: a SIM card of the terminal is changed, the terminal restarts, duration of timing starting when an attempt to access the 3GPP network by the terminal fails exceeds the first preset duration, or the terminal attempts to access the 3GPP network again using the non-3GPP network corresponding to the APN information; or if the ePDG belongs to a VPLMN, after the non-3GPP network is reselected, attempt to access the 3GPP network using the reselected non-3GPP network.

In another application scenario of the present application, the UE accesses the 3GPP network using a trusted non-3GPP network or directly accesses the 3GPP network. In this application scenario, the core network device does not include an ePDG, the first preset condition includes: duration of timing starting when an attempt to access the 3GPP network by the terminal fails exceeds the first preset duration.

The processor 730 is specifically configured to: when duration of timing starting when an attempt to access the 3GPP network by the terminal fails exceeds the first preset duration, after the non-3GPP network is reselected, attempt to access the 3GPP network again.

Figure 8:
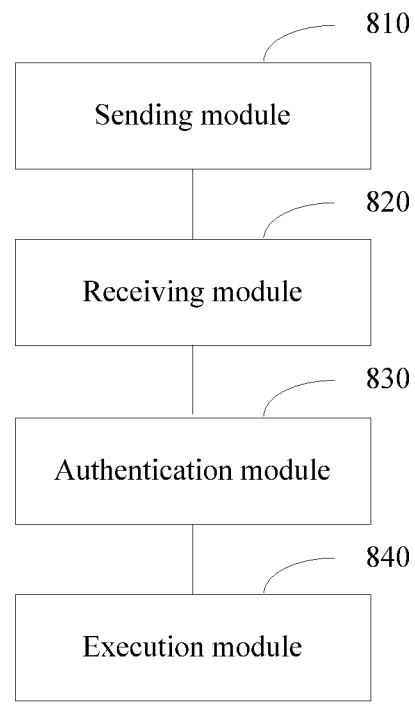
FIG. 8 is a block diagram of a processing apparatus for terminal access to a 3GPP network according to an embodiment of the present application.

Referring to FIG. 8, FIG. 8 shows a block diagram of a processing apparatus for terminal access to a 3GPP network according to an embodiment of the present application. The apparatus is applied to a terminal. As shown in FIG. 8, the apparatus may include a sending module 810, a receiving module 820, an authentication module 830, and an execution module 840.

The sending module 810 is configured to send an access request message to a core network device on a 3rd Generation Partnership Project (3GPP) network, where the access request message is used to request to access the 3GPP network, and the access request message includes identity information of the terminal.

The receiving module 820 is configured to receive an unauthorized access message sent by the core network device, where the unauthorized access message is used to indicate that the terminal is unauthorized to access the 3GPP network.

The authentication module 830 is configured to perform authentication on the core network device according to the authentication information.

In an embodiment of the present application, the authentication information includes a first message digest, where the first message digest is generated by a home subscriber server (HSS), so that the terminal performs authentication on the HSS in the core network device. The authentication module 830 in this embodiment is specifically configured to: generate a second message digest according to a preset algorithm, the identity information of the terminal, and a failure message code carried in the unauthorized access message; and if the first message digest is the same as the second message digest, determine that authentication on the HSS succeeds; or if the first message digest is different from the second message digest, determine that authentication on the HSS fails.

In another embodiment of the present application, the authentication information includes an authentication vector set, the authentication vector set includes a first parameter and a message authentication code (MAC), and the first parameter is used to generate an X-MAC. The authentication module 830 in this embodiment is specifically configured to: generate the X-MAC according to the first parameter; and if the X-MAC is the same as the MAC, determine that authentication on the HSS succeeds; or if the X-MAC is different from the MAC, determine that authentication on the HSS fails.

In still another embodiment of the present application, the authentication information of the core network device includes certificate information and signature information of an ePDG; and the authentication module 830 is specifically configured to: if both the certificate information and the signature information of the ePDG are correct, determine that authentication on the ePDG succeeds; or if the certificate information or the signature information of the ePDG is incorrect, determine that authentication on the ePDG fails.

In yet another embodiment of the present application, the authentication information includes authentication information of an ePDG and an authentication vector set, the authentication vector set includes a first parameter and a MAC, and the first parameter is used to generate an X-MAC; and the authentication module 830 is specifically configured to: if both certificate information and signature information of the ePDG are correct, determine that authentication on the ePDG succeeds; or if certificate information or signature information of the ePDG is incorrect, determine that authentication on the ePDG fails.

The X-MAC is generated according to the first parameter when authentication on the ePDG succeeds; and if the X-MAC is the same as the MAC, it is determined that authentication on the HSS succeeds; or if the X-MAC is different from the MAC, it is determined that authentication on the HSS fails.

The execution module 840 is configured to execute a corresponding network access policy after authentication on the core network device by the authentication module 830 succeeds, to reduce a quantity of access request messages that are sent by the terminal to the core network device.

In an embodiment of the present application, the execution module 840 is specifically configured to: stop an attempt to access the 3GPP network, and attempt to access the 3GPP network again when a status of the terminal satisfies a first preset condition, where the first preset condition includes at least one of the following: a subscriber identity module (SIM) card of the terminal is changed, the terminal restarts, duration of timing starting when an attempt to access the 3GPP network by the terminal fails exceeds first preset duration, or the terminal reselects a non-3GPP network.

In another embodiment of the present application, the access request message further includes access point name (APN) information, the APN information is used to indicate a non-3GPP network that is requested by the terminal for use, and the core network device includes an ePDG. The execution module 840 is specifically configured to: if the ePDG belongs to an HPLMN, stop an attempt to access the 3GPP network, and attempt to access the 3GPP network again when the status of the terminal satisfies at least one of the following: a SIM card of the terminal is changed, the terminal restarts, duration of timing starting when an attempt to access the 3GPP network by the terminal fails exceeds first preset duration, or the terminal attempts to access the 3GPP network again using the non-3GPP network corresponding to the APN information; or if the ePDG belongs to a VPLMN, after the non-3GPP network is reselected, attempt to access the 3GPP network using the reselected non-3GPP network.

In another embodiment of the present application, the core network device does not include the ePDG. In this case, the terminal accesses the 3GPP network using a trusted non-3GPP network or directly accesses the 3GPP network. The execution module 840 is specifically configured to: when duration of timing starting when an attempt to access the 3GPP network by the terminal fails exceeds first preset duration, attempt to access the 3GPP network again.

When authentication on the core network device by the authentication module 830 fails, the execution module 840 is specifically configured to: attempt to access the 3GPP network again; and if a preset quantity of times of attempts all fail, attempt to access the 3GPP network again after second preset duration.

According to the processing apparatus for terminal access to a 3GPP network provided in this embodiment, the UE sends the access request message to the core network device on the 3GPP network, and the core network device sends the unauthorized access message to the UE after determining that the UE has no permission to access the 3GPP network. The unauthorized access message includes the authentication information of the core network device. The UE performs authentication on the core network device according to the authentication information of the core network device, and executes the corresponding network access policy after authentication on the core network device by the UE succeeds, that is, after the UE determines that a source of the unauthorized access message is authorized, to reduce the quantity of access request messages that are sent to the core network device. This reduces load of the core network device, and further can improve efficiency of accessing the 3GPP network.

Figure 9:
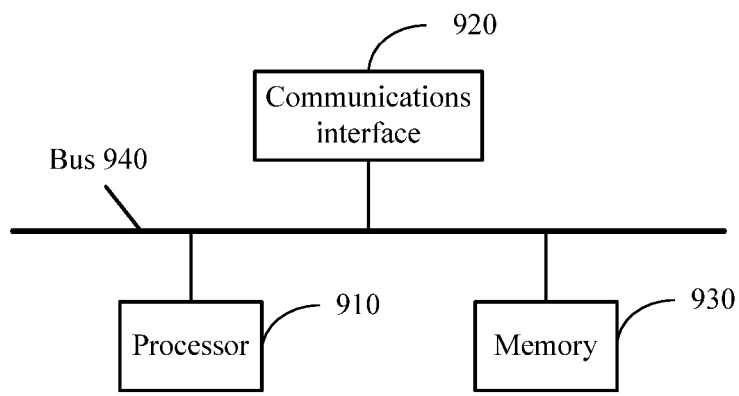
FIG. 9 is a block diagram of a core network device according to an embodiment of the present application.

Referring to FIG. 9, FIG. 9 shows a block diagram of a core network device according to an embodiment of the present application. As shown in FIG. 9, the core network device includes a bus 940, and a processor 910, a communications interface 920, and a memory 930 that are connected to the bus 940.

The communications interface 920 is configured to receive an access request message sent by a terminal, where the access request message includes at least identity information of the terminal. The memory 930 is configured to store an instruction. The processor 910 executes the instruction to send, using the communications interface 920, an unauthorized access message to the terminal when determining, according to the identity information of the terminal, that the terminal has no permission to access a 3GPP network. The unauthorized access message includes authentication information of the core network device, and the authentication information is used by the terminal to perform authentication on the core network device.

In an embodiment of the present application, if the core network device includes an ePDG, the authentication information includes certificate information and signature information of the ePDG; or the authentication information includes certificate information and signature information of the ePDG and an authentication vector set, where the authentication vector set is generated by an HSS when the HSS determines that the terminal is unauthorized to access the 3GPP network, and the authentication vector set includes a first parameter and a message authentication code (MAC).

In another embodiment of the present application, if the core network device does not include an ePDG, the authentication information includes a first message digest. The first message digest is generated by an HSS according to a preset algorithm, a failure message code carried in the unauthorized access message, and the identity information of the terminal. Alternatively, the authentication information includes an authentication vector set.

For a process in which the terminal performs authentication on the ePDG according to the authentication information of the ePDG, a process in which the terminal performs authentication on the HSS according to the authentication vector set, and a process in which the terminal performs authentication on the HSS according to the first message digest, refer to related content of the corresponding method embodiments. Details are not described herein again.

According to the core network device provided in this embodiment, the core network device determines, according to the identity information of the terminal, whether the terminal has permission to access the 3GPP network; and if determining that the terminal does not have such permission, generates the unauthorized access message. The unauthorized access message carries the authentication information of the core network device. The terminal performs authentication on the core network device according to the authentication information of the core network device, and executes a corresponding network access policy after authentication on the core network device by the terminal succeeds, that is, after the terminal determines that a source of the unauthorized access message is authorized, to reduce a quantity of access request messages that are sent to the core network device. This reduces load of the core network device, and further improves efficiency of accessing the 3GPP network.

Figure 10:
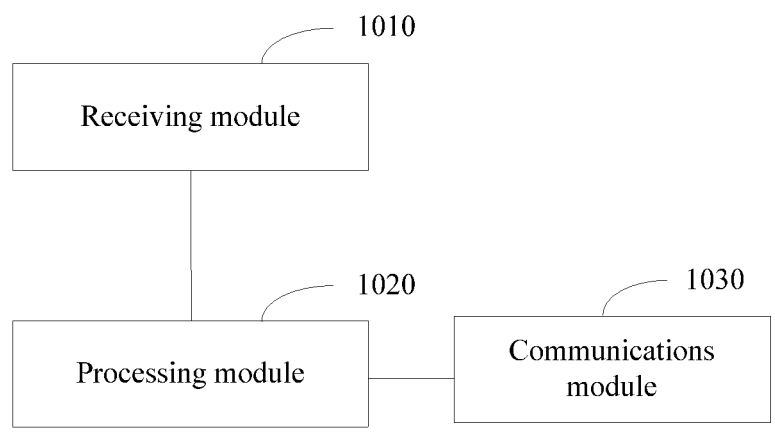
FIG. 10 is a block diagram of another processing apparatus for terminal access to a 3GPP network according to an embodiment of the present application.

Referring to FIG. 100, FIG. 10 shows a block diagram of a processing apparatus for terminal access to a 3GPP network according to an embodiment of the present application. The apparatus is applied to a core network device. As shown in FIG. 10, the apparatus may include a receiving module 1010, a processing module 1020, and a communications module 1030.

The receiving module 1010 is configured to receive an access request message sent by a terminal, where the access request message includes at least identity information of the terminal.

The processing module 1020 is configured to send, using the communications module 1030, an unauthorized access message to the terminal when determining, according to the identity information of the terminal, that the terminal has no permission to access a 3GPP network, where the unauthorized access message includes authentication information of the core network device, and the authentication information is used by the terminal to perform authentication on the core network device.

In an embodiment of the present application, if the core network device includes an ePDG, the authentication information includes certificate information and signature information of the ePDG; or the authentication information includes certificate information and signature information of the ePDG and an authentication vector set, where the authentication vector set is generated by an HSS when the HSS determines that the terminal is unauthorized to access the 3GPP network, and the authentication vector set includes a first parameter and a message authentication code (MAC).

In another embodiment of the present application, if the core network device does not include an ePDG, the authentication information includes a first message digest. The first message digest is generated by an HSS according to a preset algorithm, a failure message code carried in the unauthorized access message, and the identity information of the terminal. Alternatively, the authentication information includes an authentication vector set.

According to the processing apparatus for terminal access to a 3GPP network provided in this embodiment, the core network device determines, according to the identity information of the terminal, whether the terminal has permission to access the 3GPP network; and if determining that the terminal does not have such permission, generates the unauthorized access message. The unauthorized access message carries the authentication information of the core network device. The terminal performs authentication on the core network device according to the authentication information of the core network device, and executes a corresponding network access policy after authentication on the core network device by the terminal succeeds, that is, after the terminal determines that a source of the unauthorized access message is authorized, to reduce a quantity of access request messages that are sent to the core network device. This reduces load of the core network device, and further improves efficiency of accessing the 3GPP network.

The foregoing descriptions are merely specific implementation of the present application. It should be noted that a person of ordinary skill in the art may make several improvements or polishing without departing from the principle of the present application and the improvements or polishing shall fall within the protection scope of the present application.

What is claimed is:

1. A method, comprising:
    sending, by a terminal, an access request message to a core network device in a 3rd Generation Partnership Project (3GPP) network, wherein the access request message requests access to the 3GPP network, and the access request message comprises identity information of the terminal;
    receiving, by the terminal, an unauthorized access message from the core network device in response to sending the access request message, wherein the unauthorized access message indicates that the terminal is unauthorized to access the 3GPP network, and the unauthorized access message comprises authentication information of the core network device for the terminal to use to authenticate the core network device;
    determining, by the terminal, whether the core network device is authorized for sending the unauthorized access message, by performing, by the terminal, authentication on the core network device using the authentication information comprised in the unauthorized access message; and
    in response to determining that the authentication on the core network device is successful, discontinuing, by the terminal, to request to access the 3GPP network, and re-attempting to access the 3GPP network upon a predefined condition is satisfied.

2. The method according to claim 1, wherein the authentication information comprises a first message digest for the terminal to perform authentication on a home subscriber server (HSS) comprised in the core network device; and
    wherein performing, by the terminal, the authentication on the core network device using the authentication information comprises:
        generating a second message digest according to a preset algorithm, the identity information of the terminal, and a failure message code carried in the unauthorized access message;
        when the first message digest is the same as the second message digest, determining that authentication on the HSS has succeeded; and
        when the first message digest is different from the second message digest, determining that authentication on the HSS has failed.

3. The method according to claim 1, wherein the authentication information comprises an authentication vector set, the authentication vector set comprises a first parameter and a message authentication code (MAC), and the first parameter is used to generate an expected message authentication code (X-MAC); and
    wherein performing, by the terminal, the authentication on the core network device using the authentication information comprises:
        generating the X-MAC according to the first parameter;
        when the X-MAC is the same as the MAC, determining that authentication on an HSS comprised in the core network device has succeeded; and
        when the X-MAC is different from the MAC, determining that authentication on the HSS has failed.

4. The method according to claim 1, wherein the authentication information comprises certificate information and signature information of an evolved packet data gateway (ePDG); and
    wherein performing, by the terminal, the authentication on the core network device using the authentication information comprises:
        when both the certificate information and the signature information of the ePDG are correct, determining that authentication on the ePDG has succeeded; and
        when the certificate information or the signature information of the ePDG is incorrect, determining that authentication on the ePDG has failed.

5. The method according to claim 4, wherein the authentication information further comprises an authentication vector set, the authentication vector set comprises a first parameter and a MAC, and the first parameter is used to generate an X-MAC; and
    wherein performing, by the terminal, the authentication on the core network device using the authentication information further comprises:
        generating the X-MAC according to the first parameter when authentication on the ePDG has succeeded;
        when the X-MAC is the same as the MAC, determining that authentication on an HSS comprised in the core network device succeeds; and
        when the X-MAC is different from the MAC, determining that authentication on the HSS has failed.

6. The method according to claim 1, wherein discontinuing, by the terminal, to request to access the 3GPP network, and reattempting to access the 3GPP network upon the predefined condition is satisfied further comprises:
    stopping, by the terminal, a current reattempt to access the 3GPP network, and subsequently reattempting to access the 3GPP network when a status of the terminal satisfies a first preset condition, wherein the status of the terminal satisfies the first preset condition when a subscriber identity module (SIM) card of the terminal is changed, when the terminal restarts, when a time duration starting from a failure of an attempt to access the 3GPP network by the terminal exceeds a first preset duration, or when the terminal reselects a non-3GPP network.

7. The method according to claim 1, further comprising:
when the authentication on the core network device performed by the terminal has failed, reattempting, by the terminal, to access the 3GPP network; and
when a preset quantity of times of attempts to access the 3GPP network have failed, reattempting to access the 3GPP network after a second preset duration.

8. A method, comprising:
receiving, by a core network device in a 3rd Generation Partnership Project (3GPP) network, an access request message from a terminal requesting for accessing the 3GPP network, wherein the access request message comprises at least identity information of the terminal; and
sending, by the core network device in response to receiving the access request message, an unauthorized access message to the terminal upon determining, according to the identity information of the terminal, that the terminal has no permission to access the 3GPP network, wherein the unauthorized access message comprises authentication information of the core network device for the terminal to use to determine that the unauthorized access message is sent by an authorized device.

9. The method according to claim 8, wherein
when the core network device comprises an evolved packet data gateway (ePDG), the authentication information comprises certificate information and signature information of the ePDG, or the authentication information comprises certificate information and signature information of the ePDG and an authentication vector set, wherein the authentication vector set comprises a first parameter and a message authentication code (MAC); and
when the core network device does not comprise any ePDG, the authentication information comprises a first message digest, wherein the first message digest is generated by a home subscriber server (HSS) according to a preset algorithm, a failure message code carried in the unauthorized access message, and the identity information of the terminal, or the authentication information comprises the authentication vector set.

10. A terminal, comprises:
a transmitter, configured to send an access request message to a core network device on a 3rd Generation Partnership Project (3GPP) network, wherein the access request message requests to access the 3GPP network, and the access request message comprises identity information of the terminal;
a receiver, configured to receive an unauthorized access message from the core network device in response to sending the access request message, wherein the unauthorized access message indicates that the terminal is unauthorized to access the 3GPP network, and the unauthorized access message comprises authentication information of the core network device for the terminal to use to authenticate the core network device; and
a processor, configured to:
determine whether the unauthorized access message is sent from an authorized entity by performing authentication on the core network device according to the authentication information comprised in the unauthorized access message; and in response to determining that the authentication on the core network device is successful, discontinue to attempt to access the 3GPP network, and re-request to access the 3GPP network upon a predefined condition is satisfied.

11. The terminal according to claim 10, wherein the authentication information comprises a first message digest for the terminal to perform authentication on a home subscriber server (HSS) comprised in the core network device; and
wherein, when performing the authentication on the core network device according to the authentication information, the processor is further configured to:
generate a second message digest according to a preset algorithm, the identity information of the terminal, and a failure message code carried in the unauthorized access message; and
when the first message digest is the same as the second message digest, determine that authentication on the HSS has succeeded, and when the first message digest is different from the second message digest, determine that authentication on the HSS has failed.

12. The terminal according to claim 10, wherein the authentication information comprises an authentication vector set, the authentication vector set comprises a first parameter and a message authentication code (MAC), and the first parameter is used to generate an expected message authentication code (X-MAC); and
wherein, when performing the authentication on the core network device according to the authentication information, the processor is further configured to:
generate the X-MAC according to the first parameter; and
when the X-MAC is the same as the MAC, determine that authentication on an HSS comprised in the core network device has succeeded, and when the X-MAC is different from the MAC, determine that authentication on the HSS has failed.

13. The terminal according to claim 10, wherein the authentication information comprises certificate information and signature information of an evolved packet data gateway (ePDG); and
wherein, when performing the authentication on the core network device according to the authentication information, the processor is further configured to:
when both the certificate information and the signature information of the ePDG are correct, determine that authentication on the ePDG has succeeded; and
when the certificate information or the signature information of the ePDG is incorrect, determine that authentication on the ePDG has failed.

14. The terminal according to claim 13, wherein the authentication information further comprises an authentication vector set, the authentication vector set comprises a first parameter and a MAC, and the first parameter is used to generate an X-MAC; and
wherein, when performing the authentication on the core network device according to the authentication information, the processor is further configured to:
generate the X-MAC according to the first parameter when authentication on the ePDG has succeeded; and
when the X-MAC is the same as the MAC, determine that authentication on an HSS comprised in the core network device has succeeded, and when the X-MAC is different from the MAC, determine that authentication on the HSS has failed.

15. The terminal according to claim 10, wherein, in response to determining that the authentication on the core network device is successful, the processor is further configured to:
stop a current reattempt to access the 3GPP network, and subsequently reattempt to access the 3GPP network when a status of the terminal satisfies a first preset condition, wherein the status of the terminal satisfies the first preset condition when: a subscriber identity module (SIM) card of the terminal is changed, the terminal restarts, a time duration starting from a failure of an attempt to access the 3GPP network by the terminal exceeds a first preset duration, or the terminal reselects a first non-3GPP network.

16. The terminal according to claim 15, wherein the access request message further comprises access point name (APN) information, the APN information indicates a second non-3GPP network that is requested by the terminal for use, and the core network device comprises an ePDG; and
wherein, when stopping the current reattempt to access the 3GPP network, and reattempting to access the 3GPP network when the status of the terminal satisfies the first preset condition, the processor is further configured to:
when the ePDG belongs to a home public land mobile network (HPLMN), stop a current reattempt to access the 3GPP network, and subsequently reattempt to access the 3GPP network when a SIM card of the terminal is changed, when the terminal restarts, when a time duration starting from a failure of an attempt to access the 3GPP network by the terminal exceeds the first preset duration, or when the terminal attempts to access the 3GPP network again using the second non-3GPP network indicated by the APN information; and
when the ePDG belongs to a visited public land mobile network (VPLMN), and after the first non-3GPP network is reselected, reattempt to access the 3GPP network using the reselected first non-3GPP network.

17. The terminal according to claim 15, wherein the core network device does not comprise any ePDG, and the first preset condition is satisfied when a time duration starting from the failure of the attempt to access the 3GPP network by the terminal exceeds the first preset duration.

18. The terminal according to claim 10, wherein the processor is further configured to:
when the authentication on the core network device fails, reattempt to access the 3GPP network; and
when a preset quantity of times of reattempts to access the 3GPP network have failed, reattempt to access the 3GPP network after a second preset duration.

19. A core network device, comprising:
a receiver, configured to receive an access request message from a terminal requesting to access a 3rd Generation Partnership Project (3GPP) network, wherein the access request message comprises identity information of the terminal; and
a processor, configured to send, using a communications interface in response to receiving the access request message, an unauthorized access message to the terminal upon determining, according to the identity information of the terminal, that the terminal has no permission to access the 3GPP network, wherein the unauthorized access message comprises authentication information of the core network device for the terminal to use to verify that the unauthorized access message is sent by an authorized device.

20. The core network device according to claim 19, wherein
when the core network device comprises an evolved packet data gateway (ePDG), the authentication information comprises certificate information and signature information of the ePDG, or the authentication information comprises certificate information and signature information of the ePDG and an authentication vector set, wherein the authentication vector set comprises a first parameter and a message authentication code (MAC); and
when the core network device does not comprise an ePDG, the authentication information comprises a first message digest, wherein the first message digest is generated by a home subscriber server (HSS) according to a preset algorithm, a failure message code carried in the unauthorized access message, and the identity information of the terminal, or the authentication information comprises the authentication vector set.

* * * * *